Patented May 30, 1950

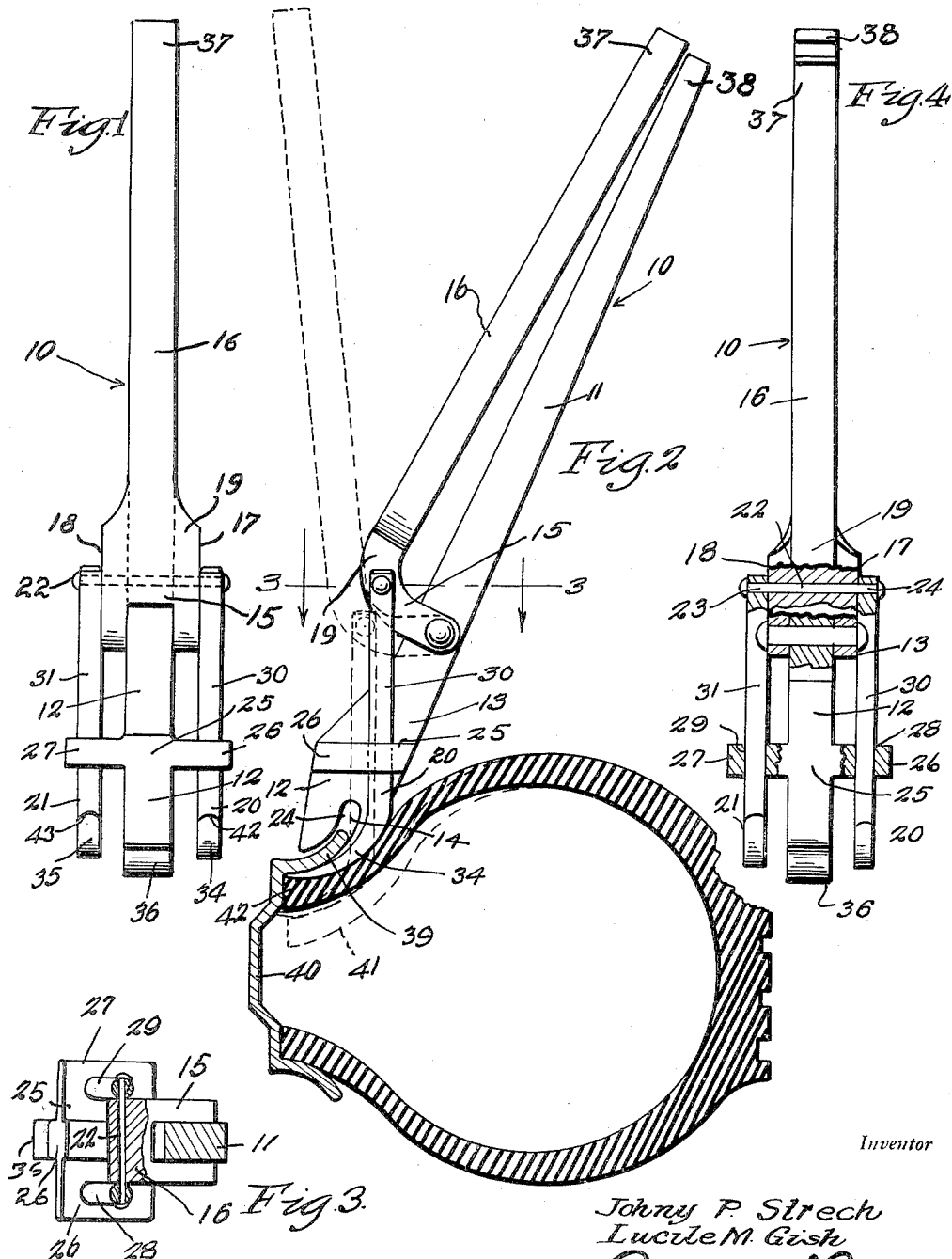

2,509,945

UNITED STATES PATENT OFFICE 2,509,945

TIRE BEAD AND RIM SEPARATING
HAND TOOL

Johny P. Strech and Lucile M. Gish, Joplin, Mo.;
said Gish assignor to said Strech Application February 21, 1946, Serial No. 649,217

1 Claim. (Cl. 157—1.17)

The invention disclosed in the following specification taken with the accompanying drawings has for its primary object to provide a simple, inexpensive and rapid means to release a tire from a wheel rim.

This invention has for another object to provide a lever actuated push for separating the rim and tire.

A still further object of the invention is to provide a rim tool having a jaw with a mouth for gripping the rim flange and lever operated push jaws slidably connected with the first jaw.

Other features and advantages will become more readily apparent from the following description and the accompanying illustrative drawings in which:

Figure 1 is an elevational view of the invention,

Figure 2 is a side elevational view of the invention shown in operating position, Figure 3 is a sectional view taken on line 3—3 of Figure 2, and Figure 4 is a view similar to Figure 1 shown partly in sections.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout and in which 10, refers to the complete invention which consists of a shank 11 having a fixed jaw 12 at its lower end 13 which jaw is provided with an arcuate slot or mouth 14. Pivotally connected to the shank 11 somewhat above the jaw 12 is the right angular end 15 of a lever 16. To the sides 17 and 18 of the lower end 19 of lever 16 are pivotally connected a pair of jaws 20 and 21 by means of a pivot pin 22 upon the outer ends 23 and 24 of which pin the said jaw members 20 and 21 swing freely.

The jaw 12 is provided with an integral cross head 25 about midway of its length, the side members 26 and 27 of which are provided with transverse slots 28 and 29 through which the shanks 30 and 31 of the jaws 20 and 21 operate and whereby their movement is controlled. The lower ends of the jaws 20 and 21 are arcuate as indicated at 34 and 35 and conform to the under arcuate lip 36 of jaw 12 and all of the jaws 34, 35 and 36 are adapted to transversely align when the end 37 of lever 16 seats against the upper terminal 38 of shank 11 whereby said three members 34, 35 and 36 may be simultaneously pushed between the flange 39 of the wheel rim 40 and a tire flange 41.

The operation of the above described appliance, as is obvious from the drawings, is to push the aligning jaw members in between the rim flange and tire flange 41 and then draw out the lever 16 from the shank 11, the action of which will cause the members 34 and 35 to push the tire flange from the rim flange 39. The feathered terminal edges 42 and 43 also make the tool very handy for removing hub caps from the wheels of a car.

From the foregoing specification it will become apparent that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

That which we claim on our invention is:

A tire bead and rim separating hand tool comprising an elongated shank, a fixed jaw on one end of the shank, said jaw having an arcuate rim receiving slot at the end remote from the shank, fixed side members on the jaw, said side members each having an elongated slot, a jaw loosely received for sliding and limited pivotal movement in each of said elongated slots on either side of said fixed jaw, a lever pivoted on said shank, said pair of jaws being pivotally connected to said lever, said pair of jaws having tire bead engaging portions of arcuate form similar to the corresponding portion of the fixed jaw insertable between the rim and tire bead.

JOHNY P. STRECH.
LUCILE M. GISH.

REFERENCES CITED

The following references are of record in the file of this patent:

UNITED STATES PATENTS

| Number | Name | Date |
|---|---|---|
| 1,452,596 | De Fernelmont | Apr. 24, 1923 |
| 1,475,519 | Snider | Nov. 27, 1923 |
| 1,507,208 | Schlenker | Sept. 2, 1924 |
| 2,319,155 | Passanante et al. | May 11, 1943 |
| 2,367,638 | McCulloch | Jan. 16, 1945 |